Feb. 20, 1968    D. E. RUNKLE ET AL    3,369,425
ADJUSTABLE NO-LASH AXIALLY MOVABLE STEERING COLUMN
Filed Dec. 23, 1965
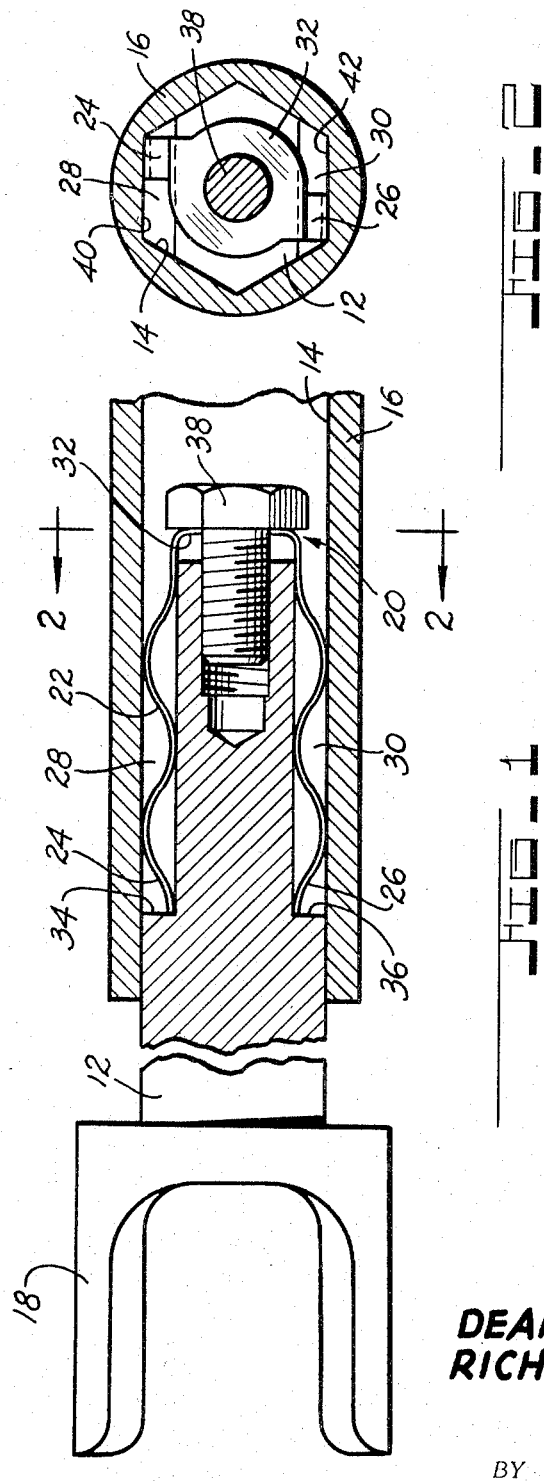
DEAN E. RUNKLE.
RICHARD W. EULER.
INVENTORS.
BY
*William N. Antonie*
ATTORNEY.

United States Patent Office 3,369,425
Patented Feb. 20, 1968

3,369,425
ADJUSTABLE NO-LASH AXIALLY MOVABLE
STEERING COLUMN
Dean E. Runkle and Richard W. Euler, South Bend, Ind., assignors to The Bendix Corporation, a corporation of Delaware
Filed Dec. 23, 1965, Ser. No. 515,870
9 Claims. (Cl. 74—493)

This invention relates to the steering column of a vehicle and, more particularly, to improvements in an axially adjustable steering column of the type described in Runkle copending application, Serial No. 477,537, now Patent No. 3,318,170.

The present practice in most vehicles is to provide an adjustable driver's seat so that the most comfortable position relative to the accelerator, brake, or other control pedals can be attained by the driver, as determined by the length of the driver's legs. However, if the steering column and wheel cannot also be adjusted, the position of the steering wheel, more often than not, will be incorrect. Thus, if a short driver adjusts the seat to a forward position so that the control pedals may be reached, the steering wheel will probably be too close to the driver's body and may even touch it. On the other hand, a tall driver who has moved the seat rearwardly may find that the steering wheel is too far away for comfort.

Vehicle manufacturers, in order to eliminate the foregoing problems, have in some instances made available axially and angularly adjustable steering columns which can be positioned relative to the driver's seat so that any normal driver, regardless of his girth, size, or height, will be comfortable and will have full control of the vehicle.

With the foregoing in mind, it is an object of this invention to provide an axially movable steering column which includes mechanism for eliminating torsional lost motion, commonly referred to as "lash," between the axially movable components of the steering column.

Another object of this invention is to provide, in an axially movable steering column having first and second shafts which are axially movable with respect to each other, mechanism operatively connected to said shafts for causing rotation and continuous frictional engagement of one of said shafts with respect to the other of said shafts to thereby eliminate torsional lash therebetween.

An important object of this invention is to provide a mechanism for eliminating torsional lash between the axially movable shafts of the steering column, said mechanism including preloaded means for causing rotation and continuous frictional engagement of one of said shafts with respect to the other of said shafts, and means for adjusting or varying the preload of said preloaded means to any desired predetermined value.

The above and other objects and features of this invention will become apparent from the following description of the mechanism taken in connection with the accompanying drawing which forms a part of this specification and in which:

FIGURE 1 is a sectional view of a portion of the steering column of a vehicle showing the axially movable components thereof, and the mechanism incorporating the invention; and FIGURE 2 is a sectional view taken along line 2—2 of FIGURE 1.

Referring to FIGURES 1 and 2, it will be seen that an axially movable shaft 12 having a hexagonal shape is located in a corresponding hexagonal bore 14 formed in a fixed shaft 16. Shaft 12 is suitably connected to the steering wheel (not shown) of a vehicle through means of a universal joint 18, only a portion of which is shown, whereas shaft 16 is suitably connected to the steering gear (not shown) of the vehicle. By telescoping shaft 12 within shaft 16, it will be apparent that axial adjustment of the vehicle steering wheel can be accomplished simply by pushing or pulling on the steering wheel. Furthermore, in the event of an accident, injury to the driver will be minimized because the steering column can telescope upon impact.

Since it is impractical from a tolerance standpoint to make the telescoping shafts 12 and 16 lash-free, a mechanism, indicated generally by the numeral 20, is utilized to maintain the two shafts in continuous frictional engagement at all times. This mechanism includes a U-shaped spring member 22, having a pair of wave-like resilient fingers 24 and 26, which are located in cavities 28 and 30, respectively, formed by machining flats parallel to the opposed polygonal surfaces of the inner shaft member 12. It will be noted in FIGURE 1 that the closed end 32 of the spring member 22 is spaced from the end of inner shaft 12 and that the fingers 24 and 26 abut the shoulders 34 and 36 formed between the machined flats and the polygonal surfaces of the inner shaft 12. A bolt or cap screw 38 extends to the closed end 32 of U-shaped spring member 22 and is threaded into the end of the inner shaft 12. It will be obvious that tightening of the bolt or cap screw will cause the crests of the wave-like fingers to contact one of the shafts 12 and 16 and the valleys of the wave-like fingers to contact the other of said shafts. From FIGURE 2 it will be seen that the fingers 24 and 26 abut opposed hexagonal surfaces 40 and 42 of shaft 16 at points off-center of each hexagonal surface so that the forces exerted by the wave-like fingers will create a couple, that is, a pair of equal parallel forces acting in opposite directions tending to produce rotation.

From the foregoing, it will be understood that the preload exerted by the wave-like fingers of the U-shaped spring can be adjusted or varied to any desired predetermined value, simply by rotating the bolt 38. Thus, rotation of the bolt in one direction will increase the preload by increasing the height of the crests and valleys of said fingers, while rotation of said bolt in the other direction will reduce the preload by decreasing the height of the crests and valleys of said fingers. Obviously, any variation in the height of the crests and valleys will vary the forces exerted by the wave-like fingers.

From the foregoing, it will be apparent that this invention provides an energy absorption device which is lash-free and adjustable for preload. The several practical advantages which flow from this type of an adjustable steering column arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of parts without departing from the spirit of the invention. For example, shafts having polygonal shapes and corresponding bores, other than hexagonal, would be suitable in the practice of this invention. Furthermore, the number of wave-like fingers which may be utilized need not be limited to two. For example, three fingers placed at 120° intervals could be utilized with hexagonal-shaped shafts and corresponding bores. For other polygonal shapes, more than three fingers may be desirable. Accordingly, we do not desire to be limited to the specific embodiment disclosed herein primarily for purposes of illustration, but instead desire protection falling within the scope of the appended claims.

Having thus described the various features of the invention, what we claim as new and desire to secure by Letters Patent is:

1. An axially movable steering column comprising first and second shafts, one of which is axially movable with respect to the other of said shafts, said first shaft having a polygonal shape and said second shaft having a corresponding polygonal bore therein receiving said first shaft, preloaded means operatively connected to said first and second shafts for causing rotation and continuous frictional engagement of one of said shafts with respect to the other of said shafts to thereby eliminate torsional lash therebetween, and means operatively connected to said preloaded means for varying the preload thereof.

2. An axially movable steering column, as defined in claim 1, wherein said preloaded means are located between said first and second shafts and off-center of the polygonal surface abutting said preloaded means.

3. An axially movable steering column, as defined in claim 2, wherein cavities are located between said shafts for receiving said preloaded means.

4. An axially movable steering column, as defined in claim 3, wherein said preloaded means comprise wave-like resilient fingers located in said cavities, said fingers having the crests thereof in contact with one of said shafts and the valleys thereof in contact with the other of said shafts.

5. An axially movable steering column, as defined in claim 4, wherein said first shaft has abutment means in said cavities, and said wave-like fingers are connected to each other at one end to form an integral spring member, said spring member having the closed end thereof spaced from the end of said first shaft and the fingers at the open end thereof in contact with said abutment means.

6. An axially movable steering column, as defined in claim 5, wherein said cavities are formed by machining flats parallel to the polygonal surfaces of said first shaft, and said abutment means are the shoulders formed between the flats and the polygonal surfaces.

7. An axially movable steering column, as defined in claim 6, wherein said flats are oppositely disposed to form diametrically opposed cavities.

8. An axially movable steering column, as defined in claim 7, wherein said integral spring member includes only two wave-like fingers extending therefrom to form a U-shaped member.

9. An axially movable steering column, as defined in claim 8, wherein the means for varying the preload includes a bolt extending through the closed end of said U-shaped member and threadedly engaging the end of said first shaft member so that rotation of said bolt in one direction will increase the preload by increasing the height of the crests and valleys of said fingers while rotation of said bolt in the other direction will reduce the preload by decreasing the height of the crests and valleys of said fingers.

No references cited.

MILTON KAUFMAN, *Primary Examiner.*